United States Patent [19]

Parker

[11] Patent Number: 4,804,195
[45] Date of Patent: Feb. 14, 1989

[54] HIGH TEMPERATURE SEALING DEVICE

[76] Inventor: Thomas H. Parker, Rd #2, Marathon, N.Y. 13803

[21] Appl. No.: 947,377

[22] Filed: Dec. 29, 1986

[51] Int. Cl.$^4$ .................................. F16J 15/447
[52] U.S. Cl. ................................ 277/12; 277/53; 277/173
[58] Field of Search .............. 277/12, 32, 53, 54, 277/173, 174, 175

[56] References Cited

U.S. PATENT DOCUMENTS

| | | | |
|---|---|---|---|
| 3,460,842 | 8/1969 | Pointer et al. | 277/53 X |
| 3,795,386 | 3/1974 | Carter et al. | 277/32 X |
| 4,103,902 | 8/1978 | Steiner et al. | 277/12 |
| 4,123,070 | 10/1978 | Peterson | 277/173 X |

FOREIGN PATENT DOCUMENTS 215011  6/1956  Australia .......................... 277/32

Primary Examiner—Robert S. Ward
Attorney, Agent, or Firm—Ralph R. Barnard

[57] ABSTRACT

A gas-tight seal for rotating high-temperature devices, comprising one or two seals of the labyrinth type, located on opposite sides of a hopper through which the shaft passes. Each labyrinth uses a plurality of rings as seal members. One set of the rings, separated by ring-shaped spacers, is rigidly attached to the hopper wall where the shaft passes into the hopper. The other set, of smaller diameter and interfitted with the first set, is slidingly fit to the rotating shaft, possibly with driving splines, but not fastened rigidly to either the shaft or the hopper. In an alternate embodiment, the spacer rings are replaced with graphite rings which contact both the stationary and rotating rings. The hopper is filled with particulate solid matter which is capable of withstanding the temperatures to be encountered, such as mica flakes or graphite flakes, or ash or char. The particulate matter forms a seal around the shaft itself, and fills the gaps in the labyrinth. If the application requires that the seal hold in pressure (as opposed to vacuum), the hopper is sealed.

13 Claims, 4 Drawing Sheets

HIGH TEMPERATURE SEALING DEVICE

BACKGROUND OF THE INVENTION

The invention pertains to the field of devices for providing gas-tight seals between rotating and stationary members. More particularly, the invention pertains to seals which are capable of providing gas-tight junctions in situations of high temperature and both rotational and longitudinal movement.

Rotating devices such as rotary kilns or calcining furnaces or the like present special problems to a designer. These problems are especially acute in rotary kilns used to convert waste matter such as garbage or sawdust into usable gas. Such devices comprise large rotating drums which are heated, either internally or externally. Raw materials are introduced into one end of the rotating drum from a stationary hopper. In the drum, the materials are carbonized and gases are driven off. At the opposite end of the drum, the gases are removed by a partial vacuum, or low pressure which results from the reaction, and any waste ash is deposited in a sealed hopper for later removal. A major problem in the process of gas production using a kiln of this design is that of providing a gas-tight seal between the huge rotating drum and the stationary assemblies at either end. Any leaks around the ends of the rotating drum, either of gas out or of air in, could be very hazardous, resulting in an explosion from air leaking into the reactor or a fire from gas leaking out.

There are several problems encountered in trying to provide such a gas-tight seal. The kiln operates at extremely high temperatures, requiring a seal which can withstand temperatures in excess of 1000° F. without breaking down. The tubes at each end of the kiln are quite large, to allow the waste and gasses to pass through, and rotate around the longitudinal axis of the machine. When the kiln is heated it expands, substantially increasing its length along its logitudinal axis. The actual expansion, of course, depends upon many factors including the length and material of the reactor and the temperature at which it is operated, but as much as six or more inches could be expected.

Thus, it is an object of the invention to provide a gas-tight seal for high-temperature rotating devices which can withstand very high heat.

It is a further object of the invention to provide a gas-tight seal for such devices which can be used with large rotating members.

It is a still further object of the invention to provide a gas-tight seal which can accommodate significant longitudinal expansion of the rotating member with no deterioration in the quantity of the seal.

One type of seal which has long be used is known as the "labyrinth seal". The labyrinth seal, as its name implies, uses a labyrinth or maze of interlocking members to block the passage of the material sealed. One set of seal members is rigidly attached to the rotating part, and the other set is rigidly attached to the stationary member. The spaces between the two sets form the maze. Kolb, U.S. Pat. No. 837,850, shows an early example of such a seal. The gaps between the interfitting members may be filled with grease or oil, as in Kolb, or water (see Dow, U.S. Pat. Nos. 957,314 and 961,216). Sometimes no packing is provided, and the resistance created by the labyrinth is considered sufficient to hold the fluid in the device (see Ljungstrom, U.S. Pat. No. 1,009,425), or the members of the seal are placed nearly in actual contact to contain the fluid (Schlegel, U.S. Pat. No. 1,895,348). At least one inventor (Hults, U.S. Pat. No. 1,508,555) used a particulate solid packing, such as soda ash or bicarbonate.

Other patents of which I am aware, and which might be considered relevant, are Muller, U.S. Pat. No. 2,841,385; Lizogub et al, U.S. Pat. No. 4,290,610; and Harig, et al, U.S. Pat. No. 4,087,334. Muller is a conventional labyrinth, using two elements on the rotary kiln with a single element attached to the stationary part in between. Lizogub adds a passage for withdrawal of fluid from the seal. Harig uses a hydraulic arrangement to force the seal together to accomodate expansion and contraction of the drum.

Obviously, water or oil would not be appropriate packing for a high temperature application. Where any accomodation for longitudinal expansion is made at all, the prior-art seals (except Harig, noted above) simply widen the space between the rotating and stationary members of the labyrinth. This lessens the gas-tightness of the seal, and (if the seal is packed at all) increases the leakage of packing material.

SUMMARY OF THE INVENTION

The invention provides a gas-tight seal for the shafts at the ends of rotating high-temperature devices, comprising two seals of the labyrinth type, located on opposite sides of a hopper through which the shaft passes. Each labyrinth uses a plurality of rings as seal members. One set of the rings, separated by ring-shaped spacers, is rigidly attached to the hopper wall where the shaft passes into the hopper. The other set, of smaller diameter and interfitted with the first set, is slidingly fit to the rotating shaft, but not fastened rigidly to either member. In a alternate embodiment, for less demanding applications, one labyrinth seal can be omitted.

The hopper is filled with particulate solid matter which is capable of withstanding the temperatures to be encountered, such as mica flakes, fine screened char or ash, or graphite flakes. The particulate matter forms a seal around the shaft itself, and fills the gaps in the labyrinth. If the application requires that the seal hold in pressure (as opposed to partial vacuum), the hopper must be sealed.

DESCRIPTION OF THE PREFERRED EMBODIMENT

Figure 1:
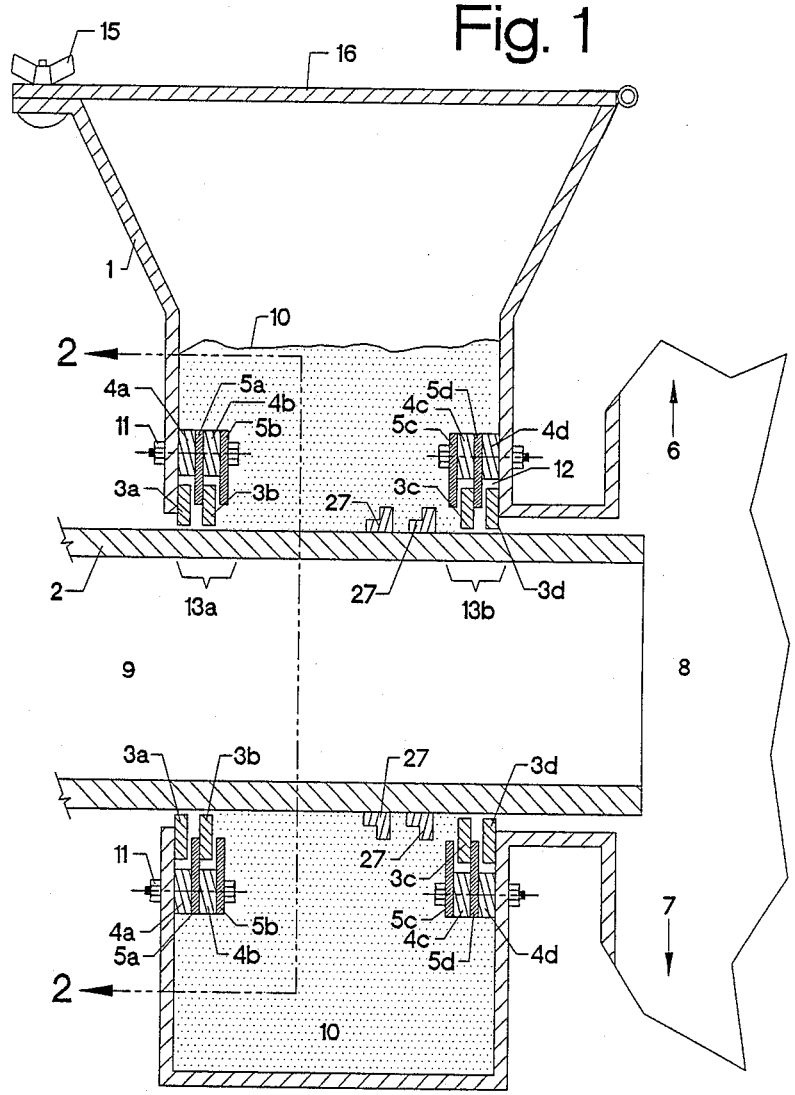
FIG. 1 shows a cut-away side view of the invention.

The preferred embodiment of the invention will be described in terms of its application to a rotary-kiln type of gas generator, the application for which it was first developed. In such an application, gas-tight seals are required between a hollow rotating shaft of 10 to 16 inches or more in diameter leaving a rotating drum in which waste material is subjected to extreme heat, and a gas and ash extraction area of lower pressure. Specific dimensions, if given, will be understood to refer to this application and shaft size. Where dimensions are given in this description, or application-specific details used, it will be understood by one skilled in the art that the details and dimensions are given by way of illustration, only, and that the seal of the invention is usable with other applications involving similar requirements.

In the drawings, identical reference numbers are used in the various figures to denote identical elements. Where more than one of the same element is used, the individual elements will be denoted by letters (i.e. 3a, 3b), or the element in general referred to by the number alone (3).

Referring first to FIG. 1, the rotating shaft (2) leaves the hot drum (9) at left. Gas and ash from the drum (9) proceeds to the extraction area (8), under a partial vacuum or low pressure, where the gas proceeds upwards to further processing (6), and the ash falls into a hopper (7) for later removal. As the drum (9) is heated or cooled, and expands or contracts, the shaft (2) must be able to slide laterally to compensate. Also, the shaft will, to some degree, rock up and down or side-to-side under the influence of the load in the drum.

My invention seals the extraction area (8) tight to the rotating shaft (2) so that no air is drawn in around the shaft to contaminate the gas generated. The seal assembly is made up of the hopper compartment (1), which has holes on each side for the shaft to pass through, and, in the preferred embodiment, two labyrinth seals (13), located on the sides of the hopper where the shaft passes through.

Figure 2:
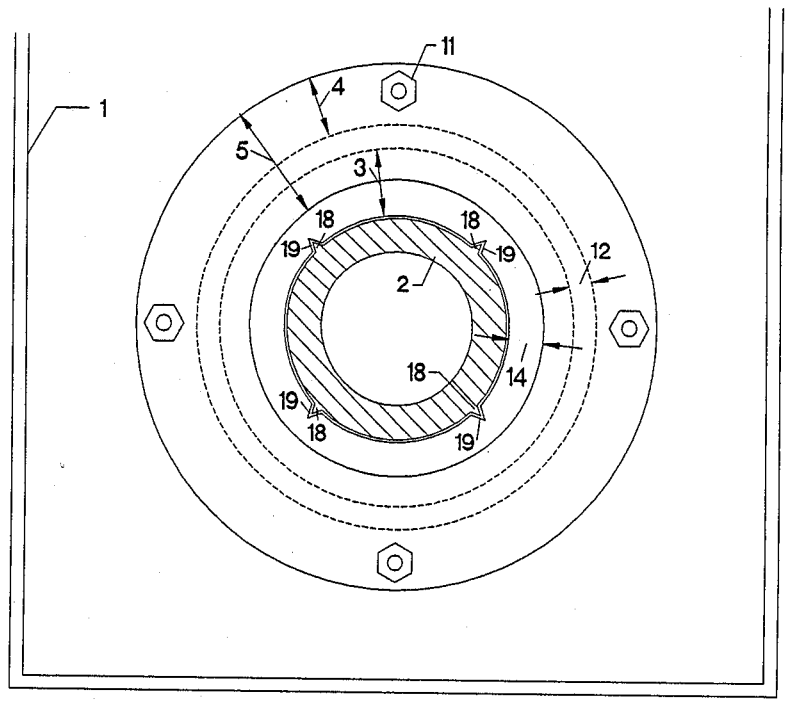
FIG. 2 shows an end view of the invention, along the lines 2—2 of FIG. 1.
Figure 3:
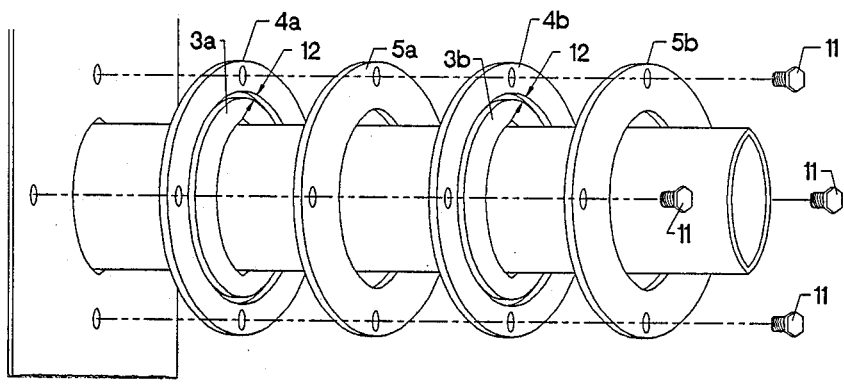
FIG. 3 shows an exploded view of one of the labyrinth seals.

FIGS. 2 and 3 show one of the two labyrinth seals. Each seal is made up of a plurality of rings of three kinds: spacers (4) and stationary rings (5) which are rigidly attached to the side of the hopper (1) by bolts (11), and rotating rings (3) which are slidingly fit to the shaft (2).

The rotating rings (3) have an inside diameter which is slightly greater than the outside diameter of the shaft (2). A clearance of approximately 0.01 to 0.015 inches has been found to be adequate in the reactor application using the seal with shafts of approximately 10 inches. This clearance allows the rings (3) to slide along the shaft (2) as it expands laterally, while not being so large as to allow a great deal of leakage. The outside diameter of the ring (3) is perhaps 2 to 4 inches greater than that of the shaft (3), for a ring width of about one to two inches. This dimension is not critical, but should be enough to allow sufficient overlap with the stationary rings (5) to allow a good seal, given allowance for the expected side-to-side vibration or axis shift of the shaft. The axis shift is a factor which varies with the specific design and application. In a refuse conversion reactor, the shift may be exaggerated by the off-center and shifting nature of the load as it tumbles in the drum. A minumum overlap of one-half to three-quarters inch has been found to be acceptable on a 10 inch shaft with ¼" axis shift.

While simple rings on a round shaft will work acceptably, it is preferred to put splines (18) on the shaft which will interfit with slots (19) in the rotating rings, so that the rings will be sure to rotate with the shaft, while still being free to slide along it. This is shown in the detail of FIG. 2. If the splines are omitted, the seal will still work acceptably, but the rotating rings may remain stationary which would result in wear of either the shaft, the rings, or both.

The stationary rings (5) have an inside diameter larger than the rotating shaft (2) to allow ample clearance (space (14)) for the shift to vibrate or shift (plus an allowance for set-up). An inside diameter of about one inch larger than the shaft diameter has been found to be adequate. The inside diameter must also allow for adequate overlap with the rotating rings (3). If the rotating rings (3) are one inch wide, and the inside diameter of stationary rings (5) is one inch greater than the shaft diameter, then the overlap will be about one half inch. The outside diameter of the stationary rings (5) is not critical. It should be enough to allow adequate material for the bolts (11) to pass through and fasten the rings (5) rigidly to the hopper (1). A ring width of about two inches has been found to be acceptable.

The spacer rings (4) are interspersed between the stationary rings (5) and between the last stationary ring (5) and the hopper (1). They fit concentrically outside of the rotating rings (3), and have an inside diameter which is enough larger than the outside diameter of the rotating rings (3) to allow for shaft (2) vibration. Approximately the same clearance from rotating ring-to-spacer (space (12)) as is allowed from shaft-to-stationary ring (space (14)) would be adequate, say one inch, giving allowance for shaft axis shift and set-up latitude. The outside diameter of the spacer (4) should be the same as the outside diameter of the stationary rings (5), so that bolts (11) can sandwich the whole assembly against the side of the hopper (11).

The spacers (4) must be thicker than the rotating rings (3), to establish the clearance between the rotating rings (3) and the stationary rings (5). The clearance must be enough so that the rings (3) may rotate freely. In a test embodiment, spacers of 12 gauge steel (0.105") with rings of 14 gauge (0.075") was found to be acceptable.

The example shown in the drawing uses two stationary rings (5), two rotating rings (3) and two spacers (4) per seal (13). This is shown for illustration only, and not by way of limitation, although such a number of elements has been found to be adequate for the application described. It will be recognized by one skilled in the art that additional rings and spacers could be added within the teachings of the invention, and that the seal would improve to some extent with the additional rings. It would be well within the ability of one skilled in the art to add or remove rings as might be needed for a particular temperature/pressure application.

As stated above, the shaft (2) passes through a hole in the side of the hopper (1). This hole is ideally the same diameter as the inside diameter of the stationary rings (5), since the side of the hopper in effect forms the last stationary ring of each labyrinth.

In pressure applications, it might be preferable to provide one or more fixed rings (27) mounted on the shaft. The purpose of these rings is to make it impossible for gas to leak along the surface of the shaft where there might be some small clearance between the shaft and the packing. Fixed rings (27) are sealed to the shaft and penetrate into the packing, making such leakage impossible.

The hopper (1) is filled to a level above the tops of the seals (13) with a fluent particulate packing material (10). The packing is drawn into the gaps in the seals between the stationary (5) and rotating (3) rings, into space (12) between the rotating rings (3) and spacers (4), and the space (14) between the stationary rings (5) and the shaft (2). The packing (10) also serves as a seal itself, around the shaft (2) in the hopper (1) between the two seals (13). The packing must be fine enough to flow into the gaps, but not so fine as to flow out easily. The fineness of the packing chosen is a trade-off. The finer the material the better the seal, but the more packing material is drawn through the seals into the lower pressure area and leaks outside the seals. The packing material is preferably not abrasive, and can be any fine particulate which will not melt or agglomerate or otherwise react or break down at the expected temperature or cause an unfavorable reaction if it leaks into the reactor.

The actual packing material chosen will vary within the teachings of the invention, depending upon the application for the seal. For a high-temperature application such as the gas-generator example, a non-flammable, non-melting substance is obviously required. The packing should also be of such nature that it will not do any harm if drawn into the device being sealed, since some leakage of packing (10) through the seals (13) is inevitable. Flaked or powdered mica or graphite (carbon) has been found to be desireable for use in this application. Alternatively, the ash or char produced by the reactor itself can be used.

Where the seal of the invention is intended to protect primarily against leakage into a partial vacuum, the hopper is normally open at the top to allow for easy inspection and filling. If the seal of the invention is to be used in an application where there is a positive pressure, on the other hand, it would be preferable to place a sealable lid (16) on the hopper (1) to prevent the escape of any pressure which might leak into the hopper. The lid (16) could be fastened down by wing nuts (15), as shown, or by any other convenient means.

Figure 5:
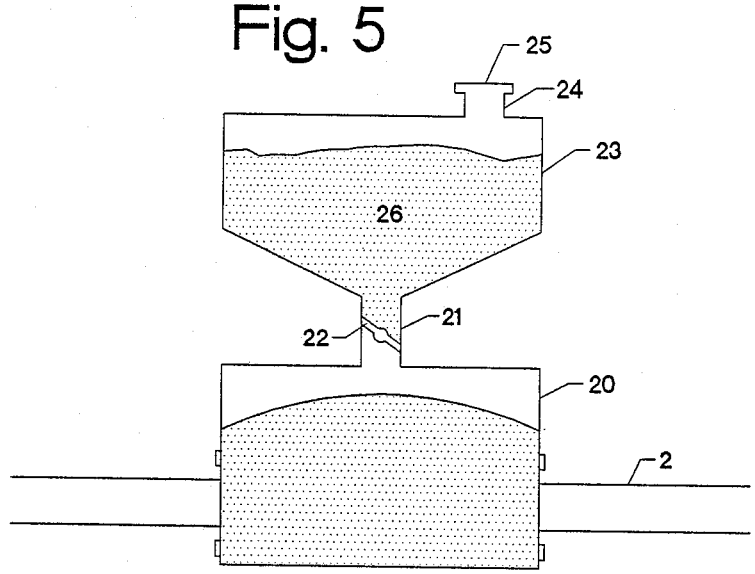
FIG. 5 shows an alternate embodiment for pressure applications having a dual sealed hopper arrangement.

FIG. 5 shows a modified hopper for use with pressure applications, in which an "air lock" style loading is provided. The lower section hopper (20) is identical to the one described above, and is the hopper which comprises part of the seal. Instead of an open top, the hopper (20) has a sealed neck (21) which may be closed by a gas-tight valve (22), here shown as a butterfly type. The valve seals the gas pressure into the lower hopper (20) and keeps back the packing material (26) in the upper hopper (23). The upper hopper (23) is also sealed, with a filler port (24) closed by some form of gas-tight cap (25). In use, the upper hopper (23) serves as a reservoir for packing material (26). It may be filled through port (24) by removing cap (25) without escape of gas, since the upper hopper (23) is sealed off from the gas seal by valve (22). When packing is required in the lower hopper (20), the valve (22) is opened, and packing (26) passes through the valve (22) and filler neck (21) into the lower hopper (20). The overall seal remains gas-tight, since the cap (25) seals the upper hopper (23).

Figure 4:
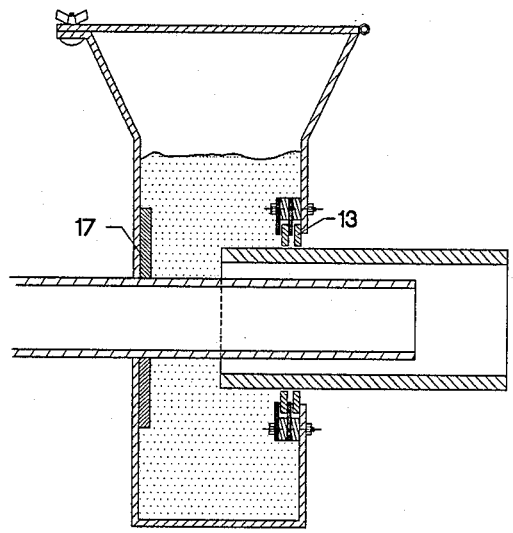
FIG. 4 shows an alternate embodiment using only one labyrinth seal.

FIG. 4 shows how, in a less demanding application, such as a reactor's cooler feed inlet end, one of the two labyrinth seals (13) could be omitted. With a single labyrinth seal (13) to retain the gas and feedstock in the reactor the seal would accomodate the lateral expansion and contraction of the reactor inlet shaft. A seal (17) of any convenient kind could be put on the opposite side, merely to keep the packing from flowing out around the rotating shaft (2). In some applications, if the unsealed end of the seal will be immersed in a hopper of particulate, no additional sealing medium at all might be needed, with the reactant itself forming the seal.

Figure 6:
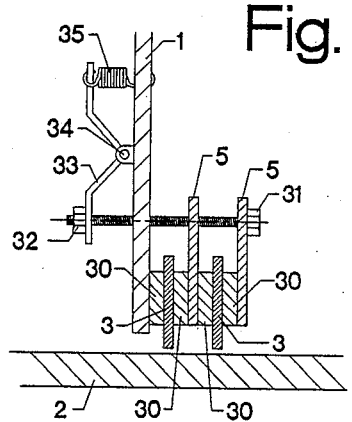
FIG. 6 shows an alternate embodiment using graphite rings in place of the spacer rings.

FIG. 6 shows an alternate embodiment of the invention, particularly applicable to higher-speed applications, in which the spacer rings (4) are replaced by rings made of graphite (or other low-friction material) (30) which actually rub on the faces of the stationary rings (5) and rotating rings (3). The fasteners which attach the stationary rings (5) to the hopper (1) are spring loaded to sandwich the rings together as the graphite wears. This spring loading may be done in any way known in the art. The preferred method, as shown, replaces each of the normal bolts and nuts (FIG. 1, 11) of the fasteners of the first embodiment with a longer bolt (31) which extends through the wall of the hopper (1) far enough to allow for the maximum thickness of all of the rings when the graphite is unworn, plus enough extra to allow for a nut (32) (or cotter key, etc) against which a lever arm (33) can push. The lever (33) is roughly "V" shaped, with the center pivoting on a pivot (34). The opposite end of the lever is drawn toward the hopper wall with a strong spring (35) in tension attached at one end to the end of the lever, and at the other to the hopper wall. The spring (35) draws the end of the lever toward the hopper, forcing the other end to push outward against the nut (32), pressing the rings (3,5,30) firmly together. Alternatively, the spring could be a compression type located directly under the nut (32) and pushing outward from the hopper. This is not desireable in very high temperature applications because the heat will tend to destroy the springs if they are very close to the heat source, but in a lower temperature seal such a design could be acceptable.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential of the invention.

I claim:

1. A seal for providing a gas-tight joint between a cylindrical rotating member and a stationary member, comprising:
   a. hopper means for containing fluent material fixed to the stationary member, having four sides and a bottom, and having two holes aligned in opposite sides, each hole being greater in diameter than the outside diameter of the rotating member, whereby the rotating member may pass through the holes;
   b. at least one labyrinth seal, concentrically located on the rotating shaft at at least one of the holes in the sides of the hopper, each labyrinth seal comprising:
      1. a plurality of rotating rings slidingly fit on the rotating member, each having an inside diameter slightly greater than the outside diameter of the rotating member, and a given thickness;
      2. a plurality of spacer rings located concentrically to the rotating rings, one per rotating ring, each having an inside diameter greater than the outside diameter of its associated rotating ring, defining a space therebetween, a thickness slightly greater than that of the associated rotating ring, and an outside diameter giving sufficient ring width to allow fastening of the spacer rings to the hopper wall with a fastener means;
      3. a plurality of stationary rings, of equal number to the rotating rings, each having an inside diameter greater than the outside diameter of the rotating member, defining a space therebetween, and an outside diameter at least equal to that of the spacer rings;

4. fastener means for attaching the spacer rings and stationary rings to the side of the hopper, whereby the spacer rings and stationary rings are rigidly attached to the side of the hopper, concentric with the rotating member;
5. the rings being arranged such that the rotation rings with concentric spacer rings alternate with stationary rings, beginning with a spacer ring and rotating ring at the hopper side, and alternating along the rotating member, ending with a stationary ring at the opposite end of the seal from the hopper side;

c. the hopper being filled to a level above the labyrinth seal with a fluent particulate material sufficiently fine to fill the spaces between the rotating member and the stationary rings, and between the rotating rings and the spacer rings.

2. The seal of claim 1 further comprising a plurality of spline means radially extending from the rotating member, the rotating rings having matching notches in their inside diameters interfitted with the splines, whereby the rotation of the rotating member positively rotates the rotating rings.

3. The seal of claim 1 in which the particulate matter is a material selected from the group consisting of flaked mica, graphite, ash or char.

4. The seal of claim 1 further comprising top means for closing the top of the hopper, having a sealable input port for introduction of particulate matter, whereby any pressure in the hopper can be contained therein.

5. The seal of claim 4 further comprising:
a. a sealable upper hopper having a sealable port in the top for introduction of particulate matter, and a port in the bottom for withdrawal of particulate matter;
b. passage means located between the upper hopper and the hopper of the seal, having an input port connected to the port in the bottom of the upper hopper, and an output port connected to the sealable input port of the top of the hopper of the seal, and gas-tight valve means for controlling the passage of particulate matter from the input port to the output port located therebetween, whereby when the valve means is open, particulate matter may flow from the upper hopper into the hopper of the seal through the passage means, and when the valve is closed, gas cannot pass from the hopper of the seal into the upper hopper.

6. The seal of claim 1 in which there are two labyrinth seals, one at each hole in the sides of the hopper.

7. The seal of claim 6 further comprising a plurality of fixed rings rigidly and sealably attached to the rotating member, located between the two labyrinth seals.

8. A seal for providing a gas-tight joint between a cylindrical rotating member and a stationary member, comprising:
a. hopper means for containing fluent material fixed to the stationary member, having four sides and a bottom, and having two holes aligned in opposite sides, each hole being greater in diameter than the outside diameter of the rotating member, whereby the rotating member may pass through the holes;
b. at least one labyrinth seal, concentrically located on the rotating shaft at at least one of the holes in the sides of the hopper, each labyrinth seal comprising:
1. a plurality of rotating rings slidingly fit on the rotating member, each having an inside diameter slightly greater than the outside diameter of the rotating member;
2. a plurality of stationary rings, of equal number to the rotating rings, each having an inside diameter greater than the outside diameter of the rotating member, defining a space therebetween, and an outside diameter greater than that of the rotating rings;
3. the rings being arranged such that the rotating rings alternate with stationary rings, beginning with a rotating ring at the hopper side, and alternating along the rotating member, ending with a stationary ring at the opposite end of the seal from the hopper side;
4. a plurality of graphite rings having inside diameters approximately equal to the inside diameter of the stationary rings, being located between the hopper wall and the rotating ring adjacent thereto, and also located between each of the stationary rings and the rotating rings adjacent thereto, a graphite ring thus being located around, and in contact with, each rotating ring;
5. spring-loaded fastener means for attaching the stationary rings to the side of the hopper, whereby the stationary rings are attached to and biased toward the side of the hopper, concentric with the rotating member, sandwiching the graphite rings between the rotating rings and stationary rings and hopper side;

c. the hopper being filled to a level above the labyrinth seal with a fluent particulate material sufficiently fine to fill the spaces between the rotating member and the stationary rings, and between the rotating rings and the stationary rings.

9. The seal of claim 8 in which the spring-loaded fastener means comprises:
a. bolt means extending through the stationary rings and the side of the hopper, having a cap end in contact with the innermost stationary ring, and a length greater than the total thickness of the stationary rings, graphite rings, rotating rings, and hopper side;
b. nut means for capping the end of the bolt means on the outside of the hopper;
c. spring means for biasing the nut means away from the hopper side.

10. The seal of claim 8 in which the spring means of the spring-loaded fastener means comprises:
a. pivot means located on the side of the hopper,
b. lever means having first and second ends connected by two arms meeting at an angle, the lever pivoting on the pivot means at the point of meeting;
c. the first end of the lever means being adapted to fit between the nut means and the side of the hopper, whereby force directed on the second end of the lever means directed toward the hopper forces the first end away from the hopper wall, forcing the nut outwards;
d. a spring under tension fastened between the second end of the lever means and the hopper side, whereby the tension of the spring forces the second end of the lever toward the hopper side.

11. The seal of claim 8 further comprising a plurality of spline means radially extending from the rotating member, the rotating rings having matching notches in their inside diameters interfitted with the splines, whereby the rotation of the rotating member positively rotates the rotating rings.

12. The seal of claim 8 in which the particulate matter is a material selected from the group consisting of flaked mica, graphite, ash or char.

13. The seal of claim 8 in which there are two labyrinth seals, one at each hole in the sides of the hopper.

* * * * *